US012640822B2

(12) United States Patent
Vijayakumar et al.

(10) Patent No.: US 12,640,822 B2
(45) Date of Patent: May 26, 2026

(54) CELLULAR FIELD TESTING AUTOMATION TOOL INCLUDING CARRIER AGGREGATION COMBINATION ALIGNMENT

(71) Applicant: DISH Wireless L.L.C., Englewood, CO (US)

(72) Inventors: Nikhil Rangaraajan Vijayakumar, Littleton, CO (US); Andrew Allan, Littleton, CO (US); In-Kyung Kim, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 285 days.

(21) Appl. No.: 18/535,795

(22) Filed: Dec. 11, 2023

(65) Prior Publication Data

US 2025/0192897 A1 Jun. 12, 2025

(51) Int. Cl.
*H04B 17/00* (2015.01)

(52) U.S. Cl.
CPC ................................ *H04B 17/0085* (2013.01)

(58) Field of Classification Search
CPC ..................... H04B 17/0087; H04W 24/00–10
See application file for complete search history.

(56) References Cited

U.S. PATENT DOCUMENTS

| 11,076,346 B2 * | 7/2021 | Chinbe ............. H04W 28/0215 |
| 11,765,789 B1 | 9/2023 | Zheng |

| 2005/0272445 A1 | 12/2005 | Zellner |
| 2012/0035904 A1 | 2/2012 | Seckendorf et al. |
| 2014/0105058 A1 | 4/2014 | Hu et al. |
| 2014/0187172 A1 | 7/2014 | Partee |
| 2014/0280904 A1 | 9/2014 | Bugenhagen |
| 2015/0140956 A1 | 5/2015 | Prewitt et al. |
| 2015/0189525 A1 | 7/2015 | Schmidt et al. |

(Continued)

OTHER PUBLICATIONS

Nikhil Rangaraajan Vijayakumar et al., "Cellular Field Testing Automation Tool," U.S. Appl. No. 18/228,848, filed Aug. 1, 2023. (38 Pages).

(Continued)

*Primary Examiner* — Raymond S Dean
(74) *Attorney, Agent, or Firm* — Kipman T. Werking; Frontier IP Law PLLC

(57) ABSTRACT

A disclosed method may include (i) initiating a cellular field testing tool that tests a condition of cellular network connectivity of a device under test, (ii) detecting, by the cellular field testing tool, a first data structure specifying a first cellular carrier aggregation configuration at the device under test, (iii) detecting, by the cellular field testing tool, a second data structure specifying a second cellular carrier aggregation configuration at a reference device, and (iv) outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

20 Claims, 21 Drawing Sheets

(56)                        References Cited

U.S. PATENT DOCUMENTS

| | | | |
|---|---|---|---|
| 2015/0264591 A1* | 9/2015 | Baeder | H04L 5/001 |
| | | | 370/252 |
| 2016/0227423 A1* | 8/2016 | Bahr | H04L 5/001 |
| 2016/0277939 A1* | 9/2016 | Bertrand | H04W 16/18 |
| 2016/0373944 A1* | 12/2016 | Jain | H04L 41/5032 |
| 2017/0214734 A1* | 7/2017 | Sun | H04L 67/141 |
| 2017/0317907 A1* | 11/2017 | Chinbe | H04B 15/00 |
| 2018/0084380 A1 | 3/2018 | Lucas | |
| 2019/0215707 A1 | 7/2019 | Jackson | |
| 2021/0326680 A1 | 10/2021 | Chaaraoui et al. | |
| 2021/0385646 A1 | 12/2021 | Liu et al. | |
| 2022/0140919 A1 | 5/2022 | Linkola | |
| 2023/0380012 A1 | 11/2023 | Zheng | |
| 2024/0187958 A1 | 6/2024 | Yan et al. | |
| 2024/0361469 A1 | 10/2024 | Dupray et al. | |

OTHER PUBLICATIONS

Nikhil Rangaraajan Vijayakumar et al., "Cellular Field Testing Automation Tool: Automation of Emergency Location Accuracy Improvements," U.S. Appl. No. 18/540,581, filed Dec. 14, 2023. (46 Pages).

Nikhil Rangaraajan Vijayakumar, "Cellular Field Testing Automation Tool: Pass Fail Analysis and Test Scenario Recovery," U.S. Appl. No. 18/385,297, filed Oct. 30, 2023. (52 Pages).

Nikhil Rangaraajan Vijayakumar et al., "Cellular Field Testing Automation Tool: Automated Communication Channel Handover," U.S. Appl. No. 18/395,237, filed Dec. 22, 2023. (52 Pages).

Nikhil Rangarajan Vijayakumar et al., "Cellular Field Testing Automation Tool Including Network Conditions Monitor, Audible and Visible Conclusion Alarms, and Data Stalls," U.S. Appl. No. 18/397,781, filed Dec. 27, 2023. (60 Pages).

* cited by examiner

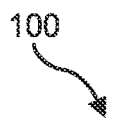

100

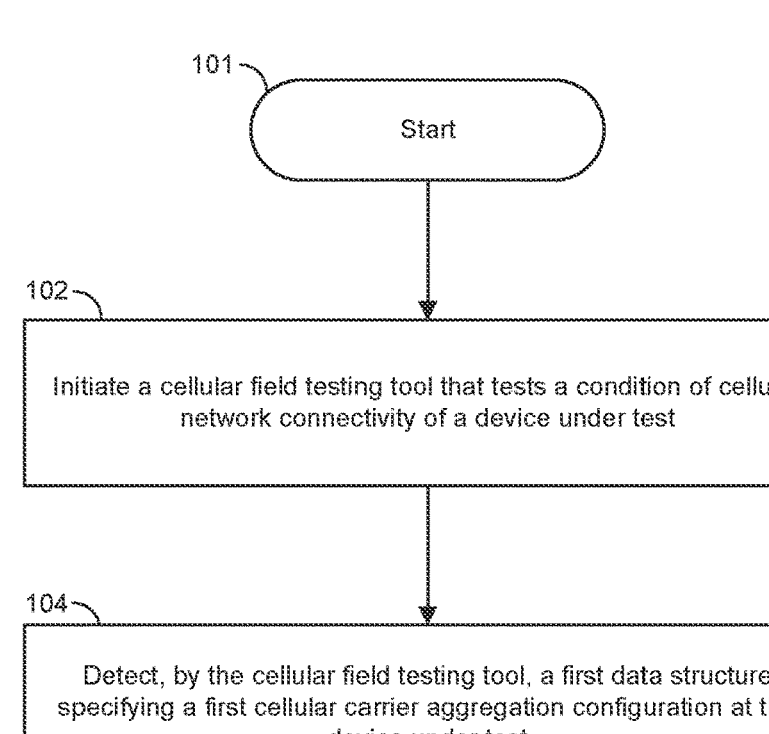

101

Start

102

Initiate a cellular field testing tool that tests a condition of cellular network connectivity of a device under test

104

Detect, by the cellular field testing tool, a first data structure specifying a first cellular carrier aggregation configuration at the device under test

106

Detect, by the cellular field testing tool, a second data structure specifying a second cellular carrier aggregation configuration at a reference device

108

Output, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy

110

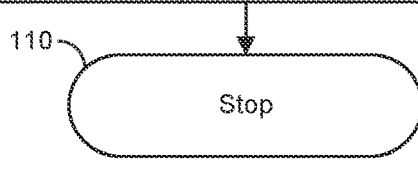

Stop

FIG. 1

300
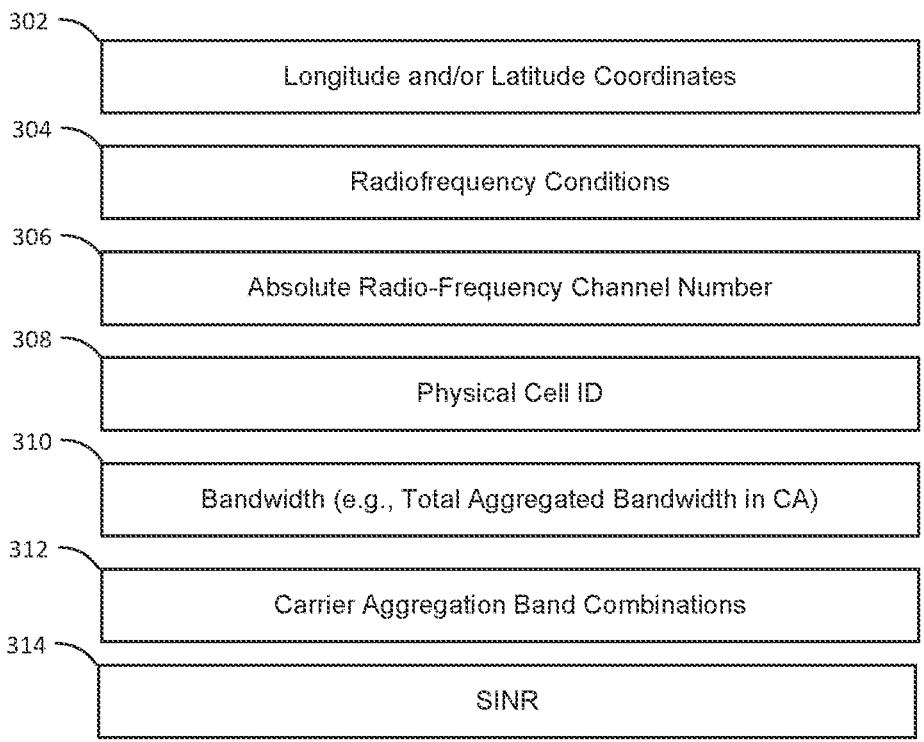
302 — Longitude and/or Latitude Coordinates
304 — Radiofrequency Conditions
306 — Absolute Radio-Frequency Channel Number
308 — Physical Cell ID
310 — Bandwidth (e.g., Total Aggregated Bandwidth in CA)
312 — Carrier Aggregation Band Combinations
314 — SINR
FIG. 3

| Interface | 5GNR-OC_Smart_Def... |
| --- | --- |
| DM Port | COM 3 Qualcomm HS-US... |
| Mdm/Net Adpt. | Cellular Qualcomm HS-U... |
| AT Port | COM 4 Qualcomm HS-US... |
| ADB Device | 269869183060043647-... |

| Time Sync. | ☑ |
| --- | --- |
| Flow Ctrl. | <NONE> |
|  | NONE |
| Baud | 4800 |
| Port | <NONE> |
| Type | Mobile |

800

806

| Radiofrequency Measurement | | |
|---|---|---|
| Serving PCI | 378 | |
| DL TP(Mbps) | | |
| Band | 2 | |
| RSRQ(dB) | -18.56 | |
| SINR(dB) | | |
| RSRP(dBm) | -106.25 | |
| EARFCN | 900 | |
| UL TP(Mbps) | | |

1000

1200

1202

11231231234 (M1)

VOICE CALL TEST (Voice_Commom) -Voice

| Call Type | Idle | Setup |
|---|---|---|
| Voice | 15/15 | 20/20 |
| Total | Success | Setup Fail |
| 1/1 | 0 (0%) | 1 (100%) |

1218

1220

1222

1224

1226

1300

1400

"Warning alert, precondition testing has failed. External intervention required."

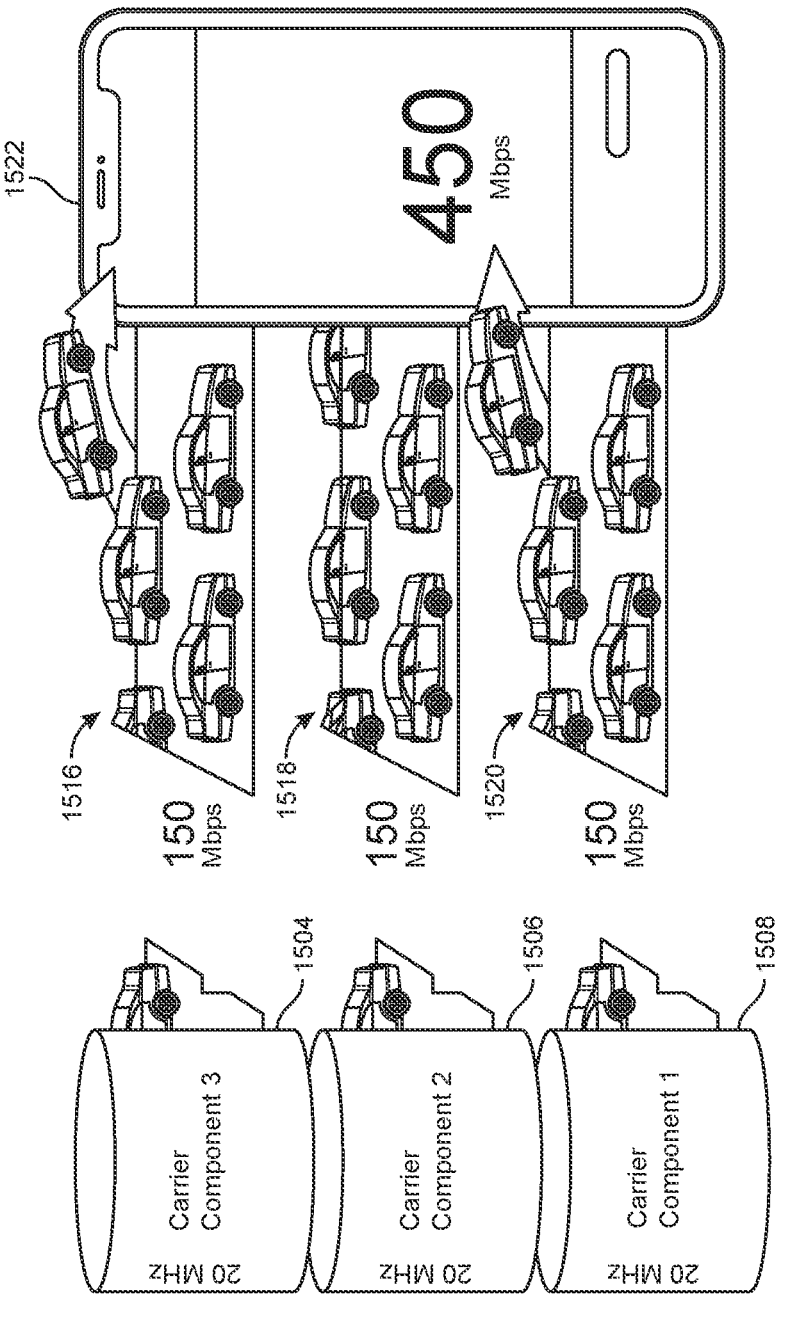
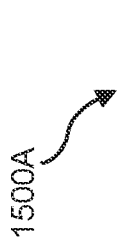
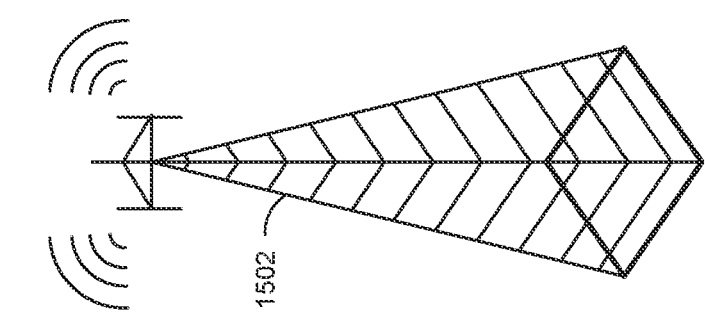
FIG. 15A

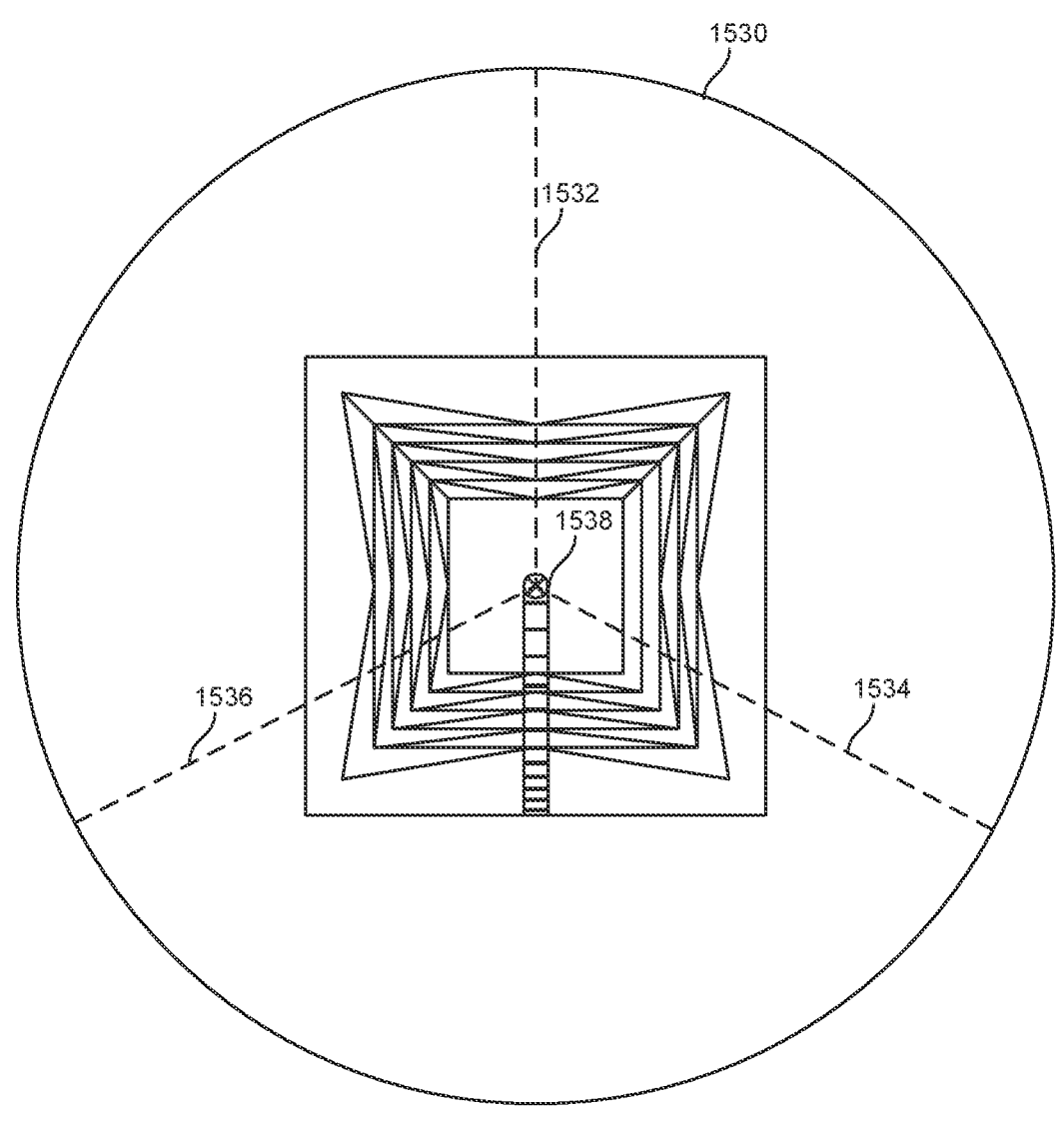
FIG. 15B

1700

1800

1802

Start

1804

Same
Band?

No

Yes

1806

Same
Bandwidth?

No

Yes

1808

Same
Total
Bandwidth?

No

Yes

1810

Consistency Policy Failed

1812

Consistency Policy Passed

1814

Stop

CELLULAR FIELD TESTING AUTOMATION TOOL INCLUDING CARRIER AGGREGATION COMBINATION ALIGNMENT

BRIEF SUMMARY

This disclosure is generally directed to a cellular field testing automation tool including carrier aggregation combination alignment functionality, as discussed in more detail below. One example method may include (i) initiating a cellular field testing tool that tests a condition of cellular network connectivity of a device under test, (ii) detecting, by the cellular field testing tool, a first data structure specifying a first cellular carrier aggregation configuration at the device under test, (iii) detecting, by the cellular field testing tool, a second data structure specifying a second cellular carrier aggregation configuration at a reference device, and (iv) outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

In some examples, the consistency policy ensures that the first cellular carrier aggregation configuration and the second cellular carrier aggregation configuration are the same.

In some examples, the consistency policy ensures that the cellular field testing tool avoids using network output at the device under test from a first radio access technology while using network output at the reference device from a second and distinct radio access technology.

In some examples, the consistency policy ensures that primary cells for the device under test and primary cells for the reference device operate on the same frequency band.

In some examples, the consistency policy ensures that primary cells for the device under test and primary cells for the reference device have the same bandwidth.

In some examples, the consistency policy ensures that a first total bandwidth for both primary cells and secondary cells of the device under test and a second total bandwidth for primary cells and secondary cells of the reference device are the same.

In some examples, the consistency policy ignores upload bandwidth.

In some examples, the consistency policy permits secondary cells of the device under test and secondary cells of the reference device to indicate a different ordering while still complying with the consistency policy.

In some examples, the consistency policy ensures that the device under test and the reference device use a same number of component carriers during the performance test.

In some examples, the cellular field testing tool is configured such that the consistency policy can be applied to a scenario where the device under test and the reference device operate using at least three component carriers.

An example system may include a physical computing processor and a non-transitory computer-readable medium encoding instructions that, when executed by the physical computing processor, cause the physical computing processor to perform operations comprising (i) initiating a cellular field testing tool that tests a condition of cellular network connectivity of a device under test, (ii) detecting, by the cellular field testing tool, a first data structure specifying a first cellular carrier aggregation configuration at the device under test, (iii) detecting, by the cellular field testing tool, a second data structure specifying a second cellular carrier aggregation configuration at a reference device, and (iv) outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

A non-transitory computer-readable medium encoding instructions that, when executed by at least one physical processor of a computing device, cause the computing device to perform operations comprising (i) initiating a cellular field testing tool that tests a condition of cellular network connectivity of a device under test, (ii) detecting, by the cellular field testing tool, a first data structure specifying a first cellular carrier aggregation configuration at the device under test, (iii) detecting, by the cellular field testing tool, a second data structure specifying a second cellular carrier aggregation configuration at a reference device, and (iv) outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

BRIEF DESCRIPTION OF THE DRAWINGS

For a better understanding of the present invention, reference will be made to the following Detailed Description, which is to be read in association with the accompanying drawings:

FIG. 1 shows a flow diagram for a method relating to a cellular field testing automation tool and carrier aggregation combination alignment.

FIG. 3 shows example preconditions that can be checked prior to enabling a user to operate the cellular field testing automation tool.

FIG. 15A shows a figurative diagram helping to illustrate the concept of cellular carrier aggregation.

FIG. 15B shows a diagram illustrating how a cellular base station may be divided into three different sectors.

DETAILED DESCRIPTION

Figure 2:
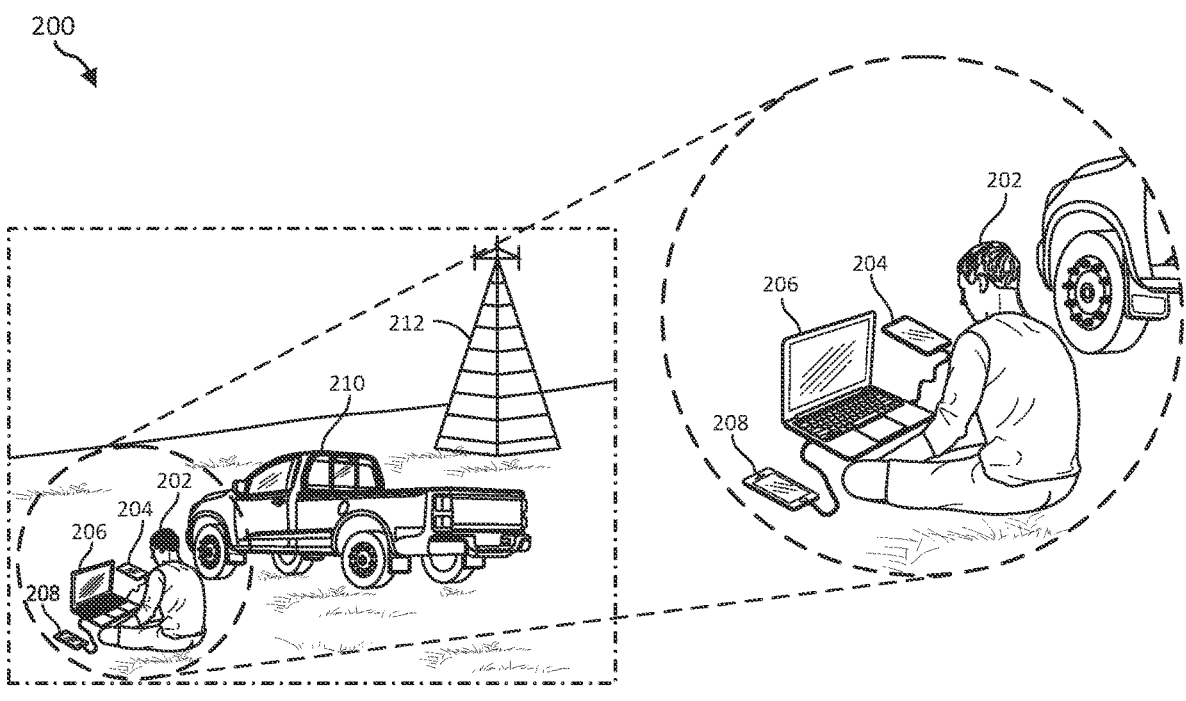
FIG. 2 shows a user operating a cellular field testing automation tool.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

FIG. 1 shows a flow diagram for an example method 100 relating to carrier aggregation combination alignment, as discussed in more detail below. As shown, method 100 may begin at step 101. At step 102, method 100 may start by initiating a cellular field testing tool that tests a condition of cellular network connectivity of a device under test. At step 104, the cellular field testing tool may detect a first data structure specifying a first cellular carrier aggregation combination at the device under test. At step 106, the cellular field testing tool may detect a second data structure specifying a second cellular carrier aggregation configuration at a reference device. Lastly, at step 108, the cellular field testing tool may output an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

As used herein, the term "cellular field testing tool" generally refers to a tool that helps to test, when a device under test is connected to a cellular base station and/or a cellular network, one or more attributes of performance and/or cellular network connectivity provided to the device under test. In other words, the cellular field testing tool generally tests how well the device under test performs (or how well the network performs) when connected, and configured, in accordance with a particular configuration at a particular location. Cellular network carriers may be requested to, or required to, satisfy one or more specifications when smartphones and/or other items of user equipment are connected to cellular networks. To help ensure that the cellular network carriers satisfy these particular specifications, the cellular field testing tool can be used to connect to a device under test and then check or verify that the device under test is actually achieving cellular network connectivity that satisfies one or more corresponding performance metrics, which may include dozens or even hundreds of such performance metrics. In some examples, a cellular field testing tool may correspond to (or include) a radio frequency drive testing tool, as that term is used by those having skill in the art.

Despite the above, some cellular field testing tools can suffer from one or more deficiencies or sub-optimizations and these tools may, therefore, benefit from one or more improvements, including improvements that automate one or more procedures that assist a user with operating the tool. These improved cellular field testing tools can, therefore, enable employees, contractors, and/or administrators of the cellular network carriers to appropriately operate these tools even if the administrators lack a degree of experience, sophistication, and/or detailed education regarding the performance and operation of the tools. In other words, automated improvements for the cellular field testing tools can enable less sophisticated operators to operate the tools in a more streamlined and/or user-friendly manner. Consequently, these improvements can furthermore reduce a burden on the carriers of training and/or educating these operators, while further increasing a potential pool of candidate operators for carrying out these testing procedures, as discussed in more detail below.

Similarly, as used herein, the term "precondition" can generally refer to one or more conditions that must be satisfied prior to the starting of a specific and corresponding cellular field testing tool test. Generally speaking, these preconditions refer to contextual preconditions that help to establish that the cellular field testing tool, when operating, will perform successfully and obtain results that are valid and useful (see the discussion of FIG. 3 below). Accordingly, the term "precondition," as used herein, generally does not refer to universal software preconditions that would generally apply even outside of the context of cellular field testing tools. For example, the term "precondition," as used herein, will generally not refer to a requirement to powering on the computing device executing the cellular field testing tool, in view of the fact that such a precondition would generally apply to all software even outside of the context of cellular field testing tools.

As used herein, the term "set" can generally refer to a collection of at least one precondition, unless indicated otherwise. Generally speaking, such cellular testing tools may benefit from checking or verifying a larger multitude of preconditions, as discussed in more detail below.

FIG. 2 shows an illustrative diagram 200 that helps to establish a context in which the methods described herein may be performed. As further shown in this diagram, a user or operator 202 may execute a cellular field testing tool on an item of user equipment or a computing device, such as a laptop 206. At the same time, the user may connect to additional computing devices and/or items of user equipment, such as a smartphone 204 and/or smartphone 208. In some examples, smartphone 204 may correspond to a device under test, where a smartphone 208 may correspond to a reference device (e.g., a device that may have been previously tested and/or verified as operating within specifications), or vice versa. For completeness, diagram 200 also illustrates how user 202 may have driven a truck 210 to a remote area at a particular location, where the user may establish cellular network connectivity with a cellular base station 212.

FIG. 3 shows a helpful list 300 of illustrative examples of preconditions that can be checked. Precondition 302 includes longitude and/or latitude coordinates. For example, this may involve verifying that the device under test and/or the reference device (which can generally be co-located as shown in FIG. 2) are sufficiently close to, or located within, particular geolocation coordinates or perimeters. Precondition 304 includes radiofrequency conditions. Illustrative examples of such aerial frequency conditions may include one or more of the following values or measurements: Reference Signal Received Power (RSRP), Reference Signal Received Quality (RSRQ), and/or Signal to Interference plus Noise Ratio (SINR). Other illustrative examples of radio frequency conditions, which may be more or less applicable or relevant, in various embodiments, than those listed above, may further include Received Signal Strength Indicator (RSSI), Signal to Noise plus Interference Ratio (SNIR), Signal to Noise Ratio (SNR), Arbitrary Strength Unit (ASU), and/or Signal to Noise Ratio (RS SINR or RSSNR).

Returning to FIG. 3, precondition 306 may include an Absolute Radio-Frequency Channel Number (ARFCN). This particular value may refer to a unique number given to each radio channel in a Global System for Mobile Communications (GSM) cellular network. Precondition 308 may refer to a physical cell ID. As illustrated in FIG. 2, the device under test and/or the reference device may be connected to a computing device, such as a laptop, that executes the cellular field testing tool. These connections may be wired or wireless, and wired connections may be formatted to conform with the PCI protocol, USB protocol, BlueTooth, etc. Helping to ensure proper connections to the computing device that is executing the cellular field testing tool helps to ensure that, when the tool executes a specific test, the corresponding connection with the device under test and/or reference device is appropriately established to successfully interface with the logging tool to collect upload and download packets sent and received from the device under test and/or the reference device. Precondition 310 may refer to the total, aggregated bandwidth of both the device under test and the reference device, if carrier aggregation (CA) is applicable, to ensure that the device under test and the reference device are conducted under the same network conditions. Lastly, precondition 312 can refer to carrier aggregation cell combinations. As understood by those having skill in the art, some cellular network carriers can aggregate portions of spectrum and/or their cellular networks (e.g., for roaming purposes, etc.). Precondition 312 may help to check and verify that both the device under test and the reference device have the same band configurations aggregated prior to the beginning of performing one or more specific tests by the cellular field testing tool. Precondition 314 can refer to Signal to Interference and Noise Ratio (SINR).

Figure 4:
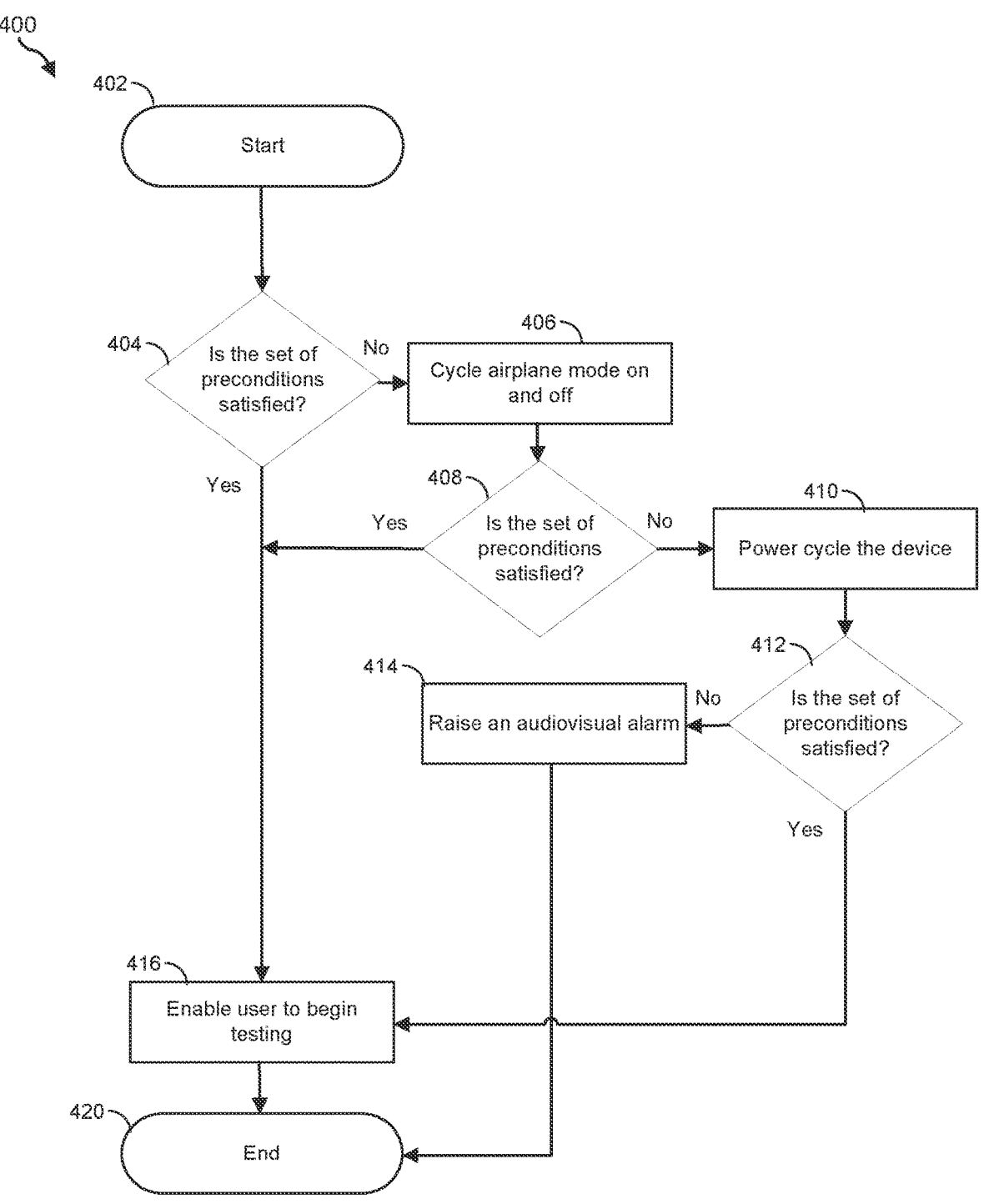
FIG. 4 shows another flow diagram for a method performed by a cellular field testing automation tool.

FIG. 4 shows a flow diagram for an example method 400 relating to operation of the cellular field testing tool. Method 400 helps to illustrate how, when checking for whether preconditions are satisfied, embodiments described herein may perform a series of different remedial actions in response to detecting that the preconditions are actually not satisfied. In some examples, the series of remedial actions may be increasingly staggered in terms of seriousness or severity, as discussed further below. The example of method 400 includes a series of three separate and staggered remedial actions (see step 406, step 410, and step 414). Although this example focuses on a set of three remedial actions, any suitable number or arbitrary number of remedial actions may be performed, in a parallel manner, as understood by those having skill in the art, with the goal of eventually achieving the successful satisfaction of all the preconditions. Moreover, although this example focuses on checking the exact same set of preconditions at each stage of the staggered process, in other examples the exact number or identity of the members of the set of preconditions may vary, slightly or more than slightly, between the different stages of the staggered process.

At step 402, method 400 may begin. At decision step 404, method 400 may perform a first check of whether the set of preconditions is satisfied. If the answer is yes at decision step 404, then method 400 may proceed to step 416, at which point method 400 may enable the user to begin a specific test, as discussed in more detail below. Alternatively, if the answer is no at decision step 404, then method 400 may proceed to step 406, at which point method 400 may cycle airplane mode on and off the specific device that is failing the preconditions (e.g., the device under test and/or the reference device).

From step 406, method 400 may proceed to decision step 408, which may correspond to the second stage of a staggered series of stages of testing whether the overall set of preconditions has been satisfied. In particular, at decision step 408, method 400 may check for the second time whether the set of preconditions has been satisfied. If the answer is no at decision step 408, then method 400 may proceed to step 410, at which point method 400 may power cycle the device that is failing the preconditions. Alternatively, again, if the answer is yes at decision step 408, then method 400 may proceed to step 416, at which point method 400 may enable the user to begin a specific test.

Lastly, as a third stage of method 400, at decision step 412, method 400 may again check whether the set of preconditions has been satisfied. If the answer is yes at decision step 412, then method 400 may proceed to step 416 again, at which point method 400 may enable the user to begin a specific test. Alternatively, if the answer is no at decision step 412, then method 400 may proceed to step 414, at which point method 400 may raise an audio and/or visual alarm to the user (see also the discussion of FIG. 14 below). At step 420, method 400 may conclude.

Figure 5:
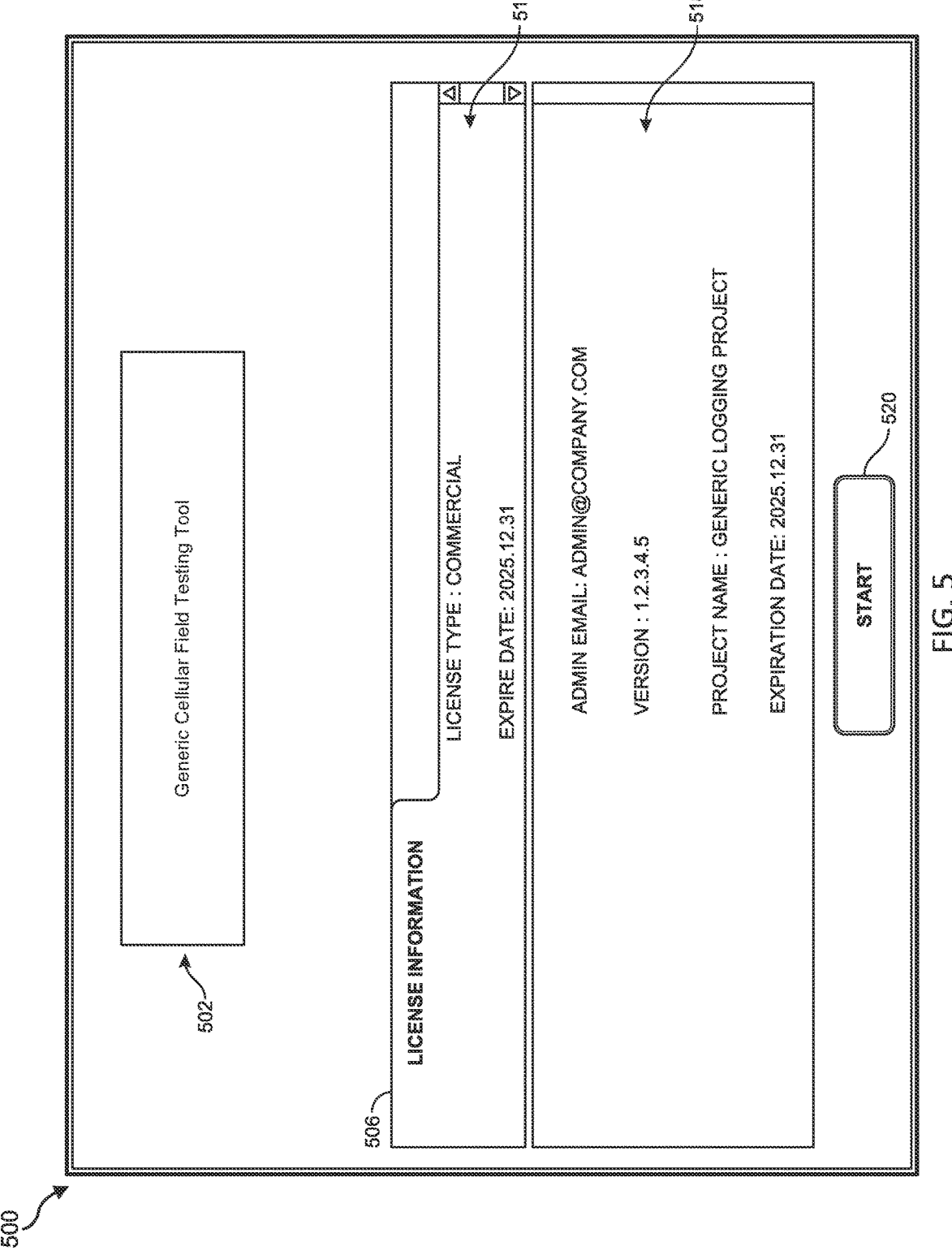
FIG. 5 shows an example introductory screen of a graphical user interface of the cellular field testing automation tool.

FIG. 5 shows a diagram 500 for an introductory screen of a graphical user interface for a cellular field testing tool that can be operated in accordance with method 400. As further shown in diagram 500, this introductory screen may include a headline 502 that indicates the name of the particular cellular field testing tool and/or software development company providing such a tool. In the simplified example of this figure, headline 502 indicates a generic name of "Generic Cellular Field Testing Tool." A graphical user interface element 506 may indicate license information. A window 516 may further provide information about the corresponding license, including its type and/or expiration date. Below that, a window 518 may further provide information about contacting a corresponding cellular network carrier ("company") that may be licensing and/or operating the corresponding software, as well as indications of a version of the software, a project name, and/or an expiration date of the license.

Figure 6:
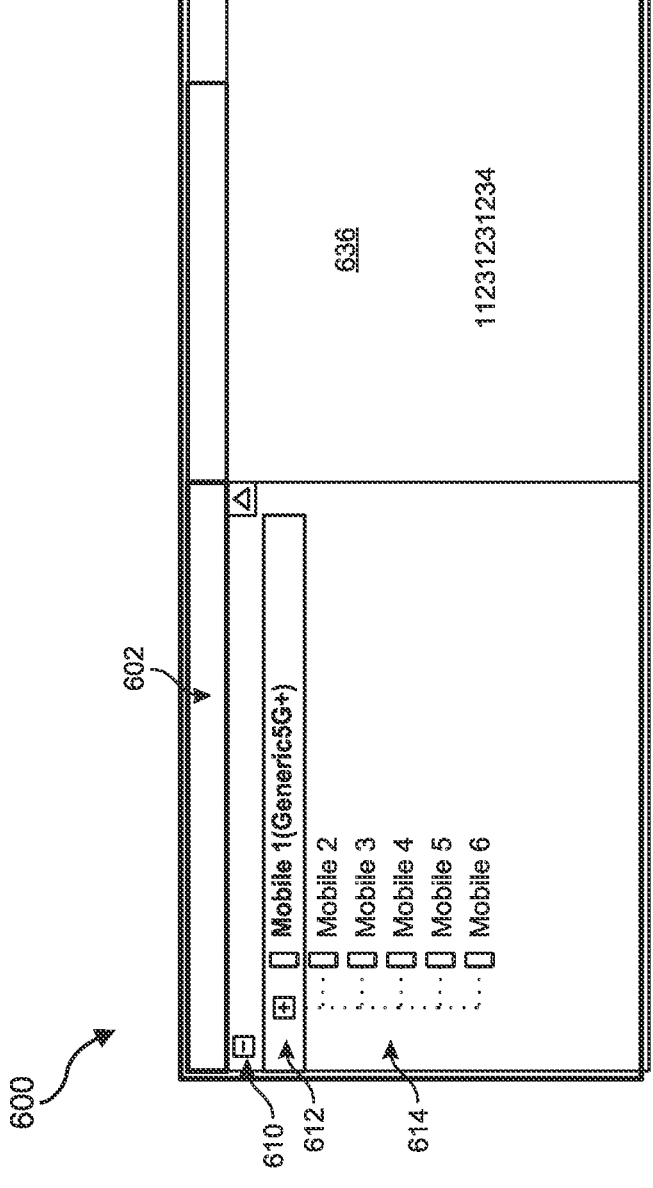
FIG. 6 shows an example screen of the graphical user interface of the cellular field testing automation tool.

FIG. 6 shows a diagram 600 of a screen of the same graphical user interface that may be presented as a result of selecting a button 520 (see FIG. 5) for starting execution of the corresponding cellular field testing tool. As further shown in diagram 600, the graphical user interface may include a devices list 602, and a drop-down menu 610 may indicate a list of mobile devices for testing. A graphical user interface element 612 may indicate the selection or connection of a specific mobile device ("Generic5G+" in this example). Moreover, a graphical user interface element 614 may further indicate a list of other candidate devices that may be selected or configured for testing. As further shown in this diagram, a portion 636 of diagram 600 indicates that the tool has connected to a particular phone number of the same mobile device corresponding to graphical user interface element 612.

Figure 7:
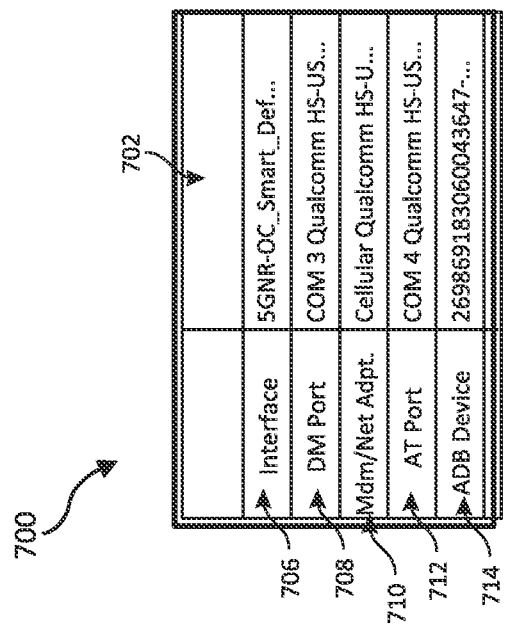
FIG. 7 shows an example screen of the graphical user interface of the cellular field testing automation tool.

FIG. 7 shows a diagram 700 of another screen of the same graphical user interface after the mobile device has been connected to initiate one or more specific tests. At this stage of operating the cellular field testing tool, the user or operator may toggle or configure one or more fields with values to set up specific testing procedures for each mobile device. Diagram 700 shows a portion 702 which corresponds to a connected mobile device of FIG. 6. A set of graphical user interface elements 706-714 show respective attributes or fields that the operator can toggle or configure to set up further testing procedures. In particular, as shown in this figure, the operator can configure, for each connected mobile device, an interface, a DM port (diagnostics and monitoring port), an MDM (Mobile Device Management) net adapter value, an AT port, and/or an Android Debug Bridge device value. In various examples, one or more of these values may be required to be configured to proceed with specific testing procedures. These examples of parameters that can be configured prior to beginning specific testing procedures are merely illustrative and, in other examples, additional or alternative parameters may be configured as appropriate.

Figure 8:
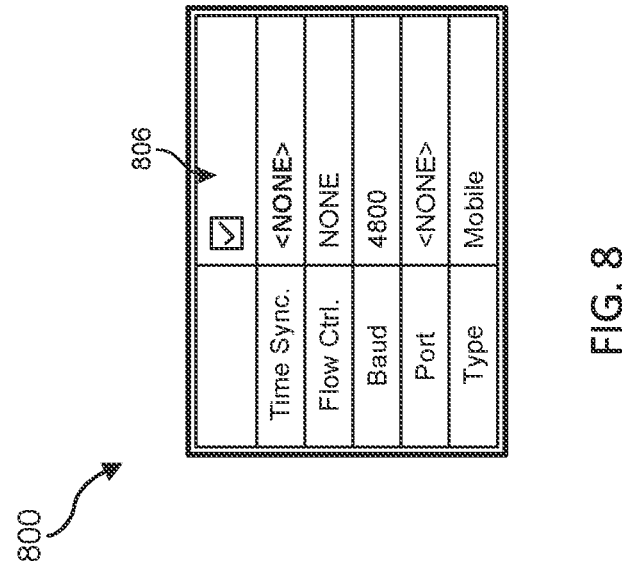
FIG. 8 shows an example screen of the graphical user interface of the cellular field testing automation tool.

FIG. 8 shows a diagram 800 that elaborates on a different aspect of the graphical user interface that was further shown as diagram 700. In particular, the corresponding diagram further illustrates how, prior to beginning specific testing procedures, the operator of the cellular field testing tool may toggle a Global Positioning System (GPS) field 806 to enable GPS functionality on one or more specific mobile devices that are under test.

Figure 9:
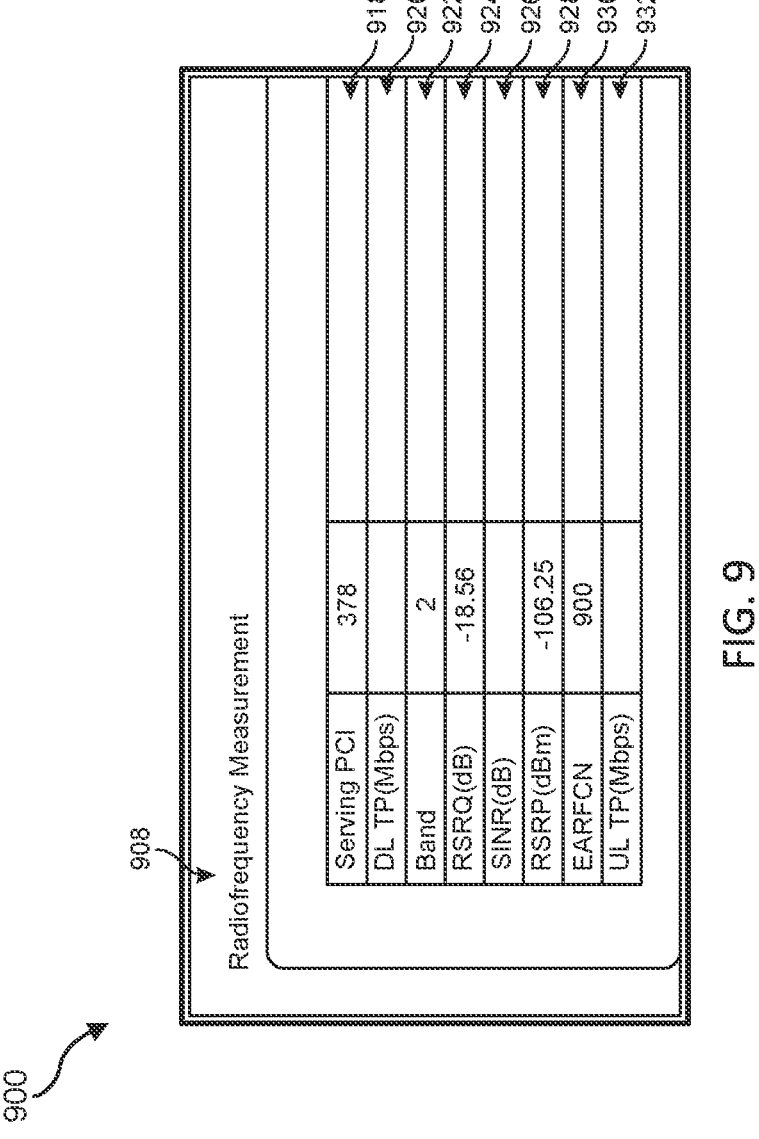
FIG. 9 shows an example screen of the graphical user interface of the cellular field testing automation tool.

FIG. 9 shows a diagram 900 of another screen of the graphical user interface of the cellular field testing tool. As further shown in this diagram, the graphical user interface can indicate to the operator one or more radiofrequency measurements and corresponding network connection attributes. A headline 908 may indicate "Radiofrequency Measurement." Rows 918-932 of diagram 900 may list respective measurement values relating to radiofrequency connectivity.

Figure 10:
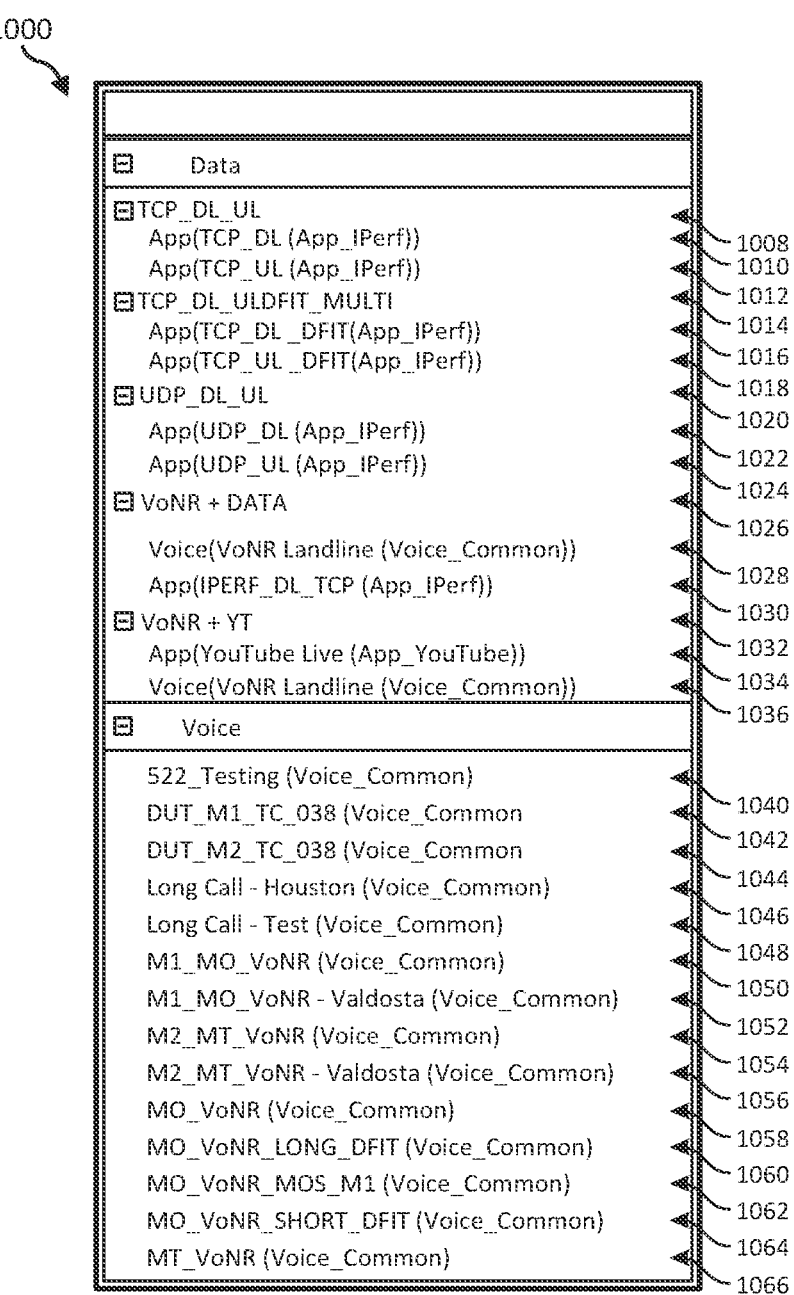
FIG. 10 shows an example screen of the graphical user interface of the cellular field testing automation tool.

FIG. 10 shows a diagram 1000 of another screen of the graphical user interface of the cellular field testing tool. As further shown in this figure, rows 1008-1066 may specify the names of different respective tests that the cellular field testing tool can perform, which can be user-customized, and these various specific tests may be categorized as either various different tests for testing data connections (see rows 1008-1036) and/or various different tests for testing voice connections (see rows 1040-1066).

Figure 11:
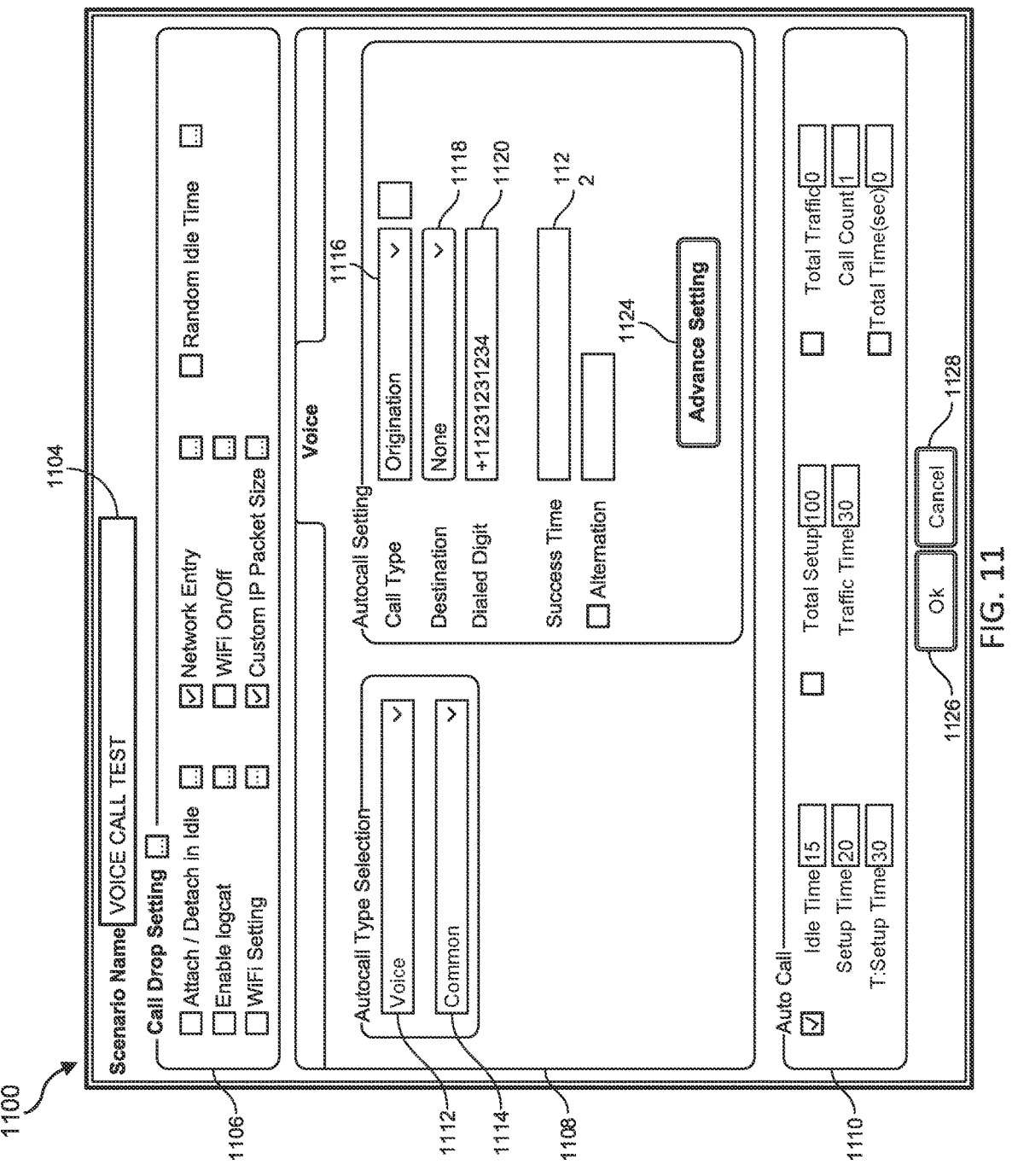
FIG. 11 shows an example screen of the graphical user interface of the cellular field testing automation tool.

FIG. 11 shows a diagram 1100 of another screen of the graphical user interface of the cellular field testing tool. As shown in this figure, diagram 1100 may include a scenario name 1104, as well as a panel 1106 of various fields or options that the operator can configure when setting up this particular test ("VOICE CALL TEST"). Another panel 1108 may further include a similar but distinct set of various fields or options that the operator can configure appropriately. Lastly, another panel 1114 may enable the user to further specify various values for another set of corresponding parameters as part of the configuration before initiating or executing the specific testing procedure. A button 1128 may enable the operator to cancel the current set of configuration procedures, and a button 1126 may enable the user to finalize configuration settings and proceed to the next stage of specific testing procedures.

Figure 12:
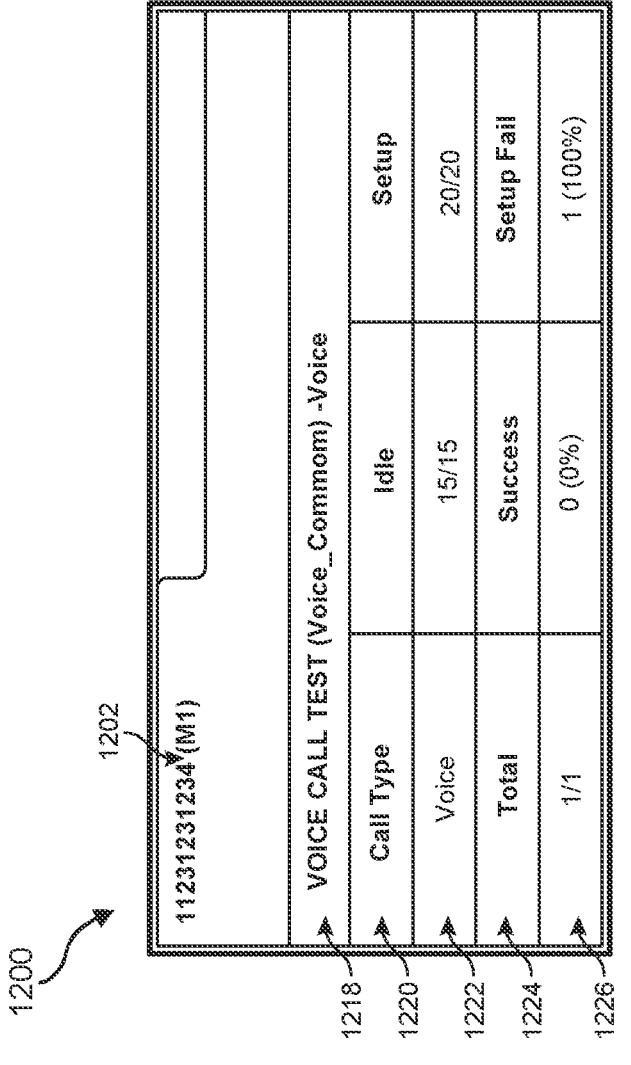
FIG. 12 shows an example screen of the graphical user interface of the cellular field testing automation tool.

FIG. 12 shows a diagram 1200 of another screen of the graphical user interface of the cellular field testing tool. An indicator 1202 may identify the phone number for the corresponding device under test. Generally speaking, the data displayed within the lower body of the window of diagram 1200 may display results, in real time, as one or more specific tests of the cellular field testing tool are being executed. In particular, a row 1220 and another respective row 1224 may display identifiers, within respective columns, to identify the type of resulting output information displayed in the rows that are immediately beneath these identifying rows. Thus, as further shown within diagram 1200, row 1222 may display values corresponding to the identifiers shown within row 1220, and row 1226 may display values corresponding to the identifier shown within row 1224. By way of illustrative example, row 1222 indicates that the call type (as indicated by row 1220) is "voice" within the same respective column.

Figure 13:
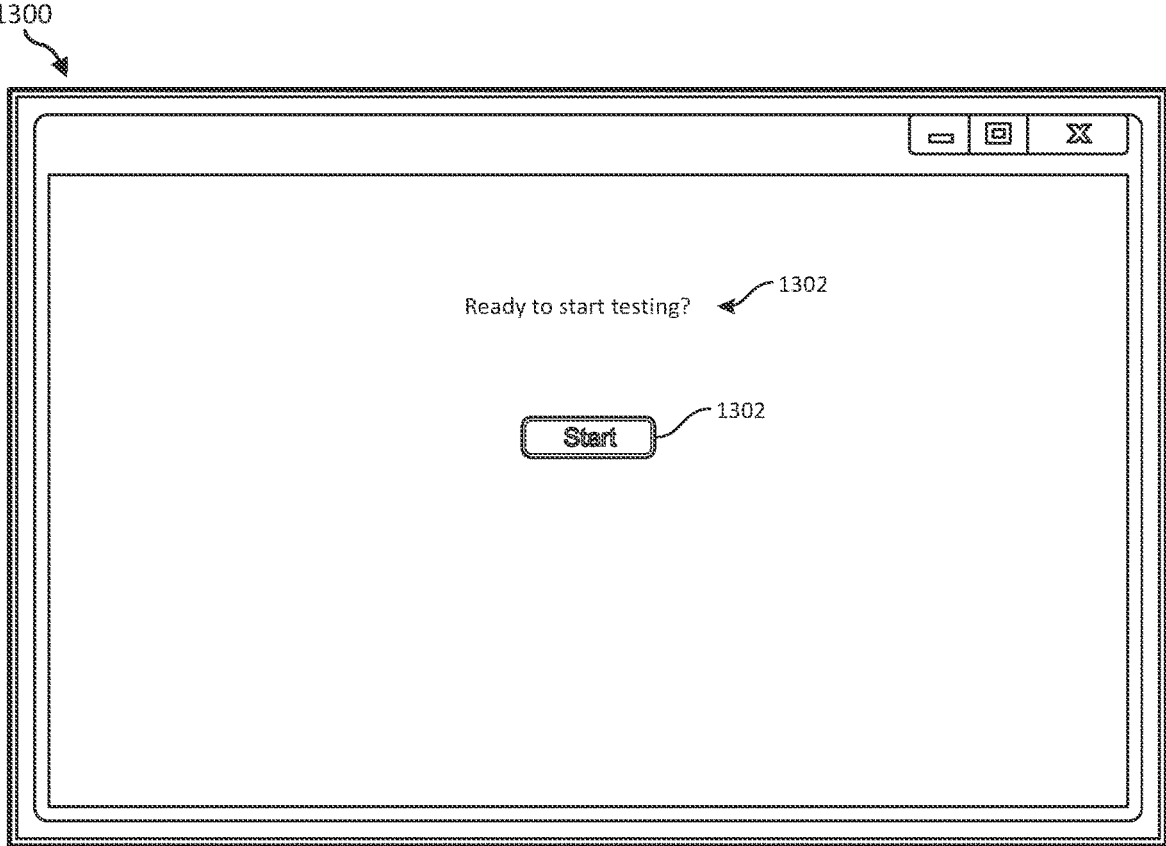
FIG. 13 shows an example screen of the graphical user interface of the cellular field testing automation tool.

FIG. 13 shows a diagram 1300 of a graphical user interface of the same cellular field testing tool that enables, or disables, the option for the operator to begin a specific test, including the specific tests that are identified or listed above by way of illustrative example. A prompt 1302 may inquire of the user whether the user is ready to begin testing procedures, after any one or more of the configuration and setup procedures that are outlined above have been performed, consistent with the discussion of FIGS. 5-12, for example. Graphical user interface element 1302, when this element is enabled, may allow the user to toggle the element and thereby finally begin specific testing procedures in accordance with the previous configuration and setup.

Nevertheless, as previously discussed above in connection with method 400, graphical user interface element 1302 and/or any suitable substitute for inputting information within the computing arts, may be disabled if the set of preconditions has not been satisfied. Thus, in various examples, graphical user interface element 1302 may be displayed in a "grayed out" manner such that, although the user can read a dimmer or grayer version of the "Start" text, attempting to toggle or select graphical user interface element 1302 may not result in any corresponding functionality. In other words, when not enabled, graphical user interface element 1302 may simply correspond to essentially frozen pixels that remain the same regardless of whether the user attempts to toggle them or not. Those having skill in the art will readily understand that any other suitable mechanism for disabling an input mechanism or graphical user interface button may be used to achieve essentially the same purpose of preventing the user from beginning a specific test procedure prior to the preconditions all being satisfied. Moreover, as soon as the preconditions are satisfied, perhaps after one or more stages of performing a series of remedial actions (see FIG. 4), graphical user interface element 1302 may be enabled such that the user can successfully toggle it to trigger the initiation of specific testing procedures.

As further discussed above, in some scenarios, even after performing a series of remedial actions (see the three remedial actions of FIG. 4), the set of preconditions may nevertheless remain unsatisfied. In that scenario, the computing device executing the cellular field testing tool may issue an alert to the user. In some related methodologies, there may be no such alert and/or the alert may be inconspicuous. Accordingly, this disclosure envisions alerts that are both conspicuous and audiovisual in nature such that the user receives both an audio alert as well as a visual alert, thereby clearly bringing this information to the attention of the user.

Figure 14:
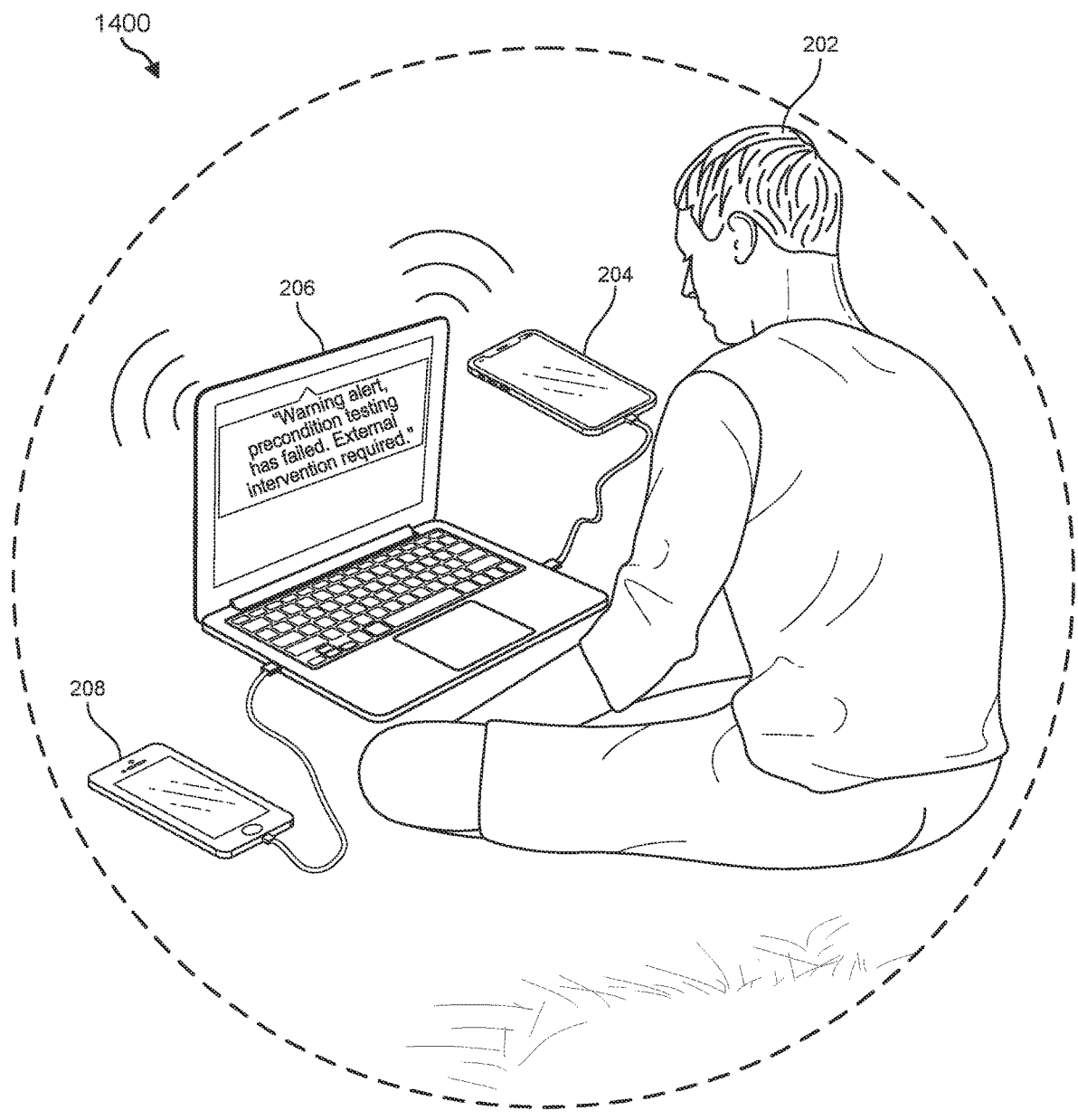
FIG. 14 shows a magnified view of the user operating the cellular field testing automation tool.

FIG. 14 shows a diagram 1400 of a magnified view of user 202 operating laptop 206 in connection with smartphone 204 and smartphone 208. As shown in this diagram, the visual alert may indicate to the user "Warning alert, precondition testing has failed. External intervention required." Those having skill in the art will readily ascertain that the particular text of this specific alert is merely an example for illustrative purposes and, in other examples, different variations and/or substitutes of such warnings may be used appropriately to notify the user.

The above discussion of FIGS. 2-14 provides background contextual information regarding radiofrequency drive testing for the following discussion of method 100 and related FIGS. 15A-18. As first discussed above, method 100 may begin at step 101. At step 102, method 100 may start by initiating a cellular field testing tool that tests a condition of cellular network connectivity of a device under test. At step 104, the cellular field testing tool may detect a first data structure specifying a first cellular carrier aggregation combination at the device under test. At step 106, the cellular field testing tool may detect a second data structure specifying a second cellular carrier aggregation configuration at a reference device. Lastly, at step 108, the cellular field testing tool may output an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

As used herein, the term "first cellular carrier aggregation combination" can refer to a combination of multiple component carriers, as discussed further below and consistent with the figures, including FIG. 17. Moreover, as used herein the term "data structure" generally refers to a software-implemented or other computer-related item of data that compiles or aggregates at least two separate but connected or associated items of data. By way of illustrative example, such a data structure may specify a number of component carriers as well as the identities of those distinct component carriers and/or indications of frequencies associated with those component carriers, thereby further describing an overall configuration of cellular carrier aggregation. As used herein, the term "consistency policy" can generally refer to any policy that accepts, as input, at least two separate data structures describing carrier aggregation configurations, respectively, and that provides an output, in response, indicating whether the two configurations are sufficiently similar, according to the policy, such that performing the performance test would produce reliable output. In other words, the conditions under which the device under test and the reference device operate may involve some similarity, but not necessarily perfect similarity or identity, in order for the output to be reliable or meaningful. There may be some flexibility, in terms of administrator wishes, desires, or preferences, regarding how sufficiently similar the configurations may be, in terms of trade-offs between efficient testing of somewhat dissimilar configurations and more accurate testing using more similar configurations, as discussed in more detail below. As used herein, the term "reliable" can simply refer to output that is sufficiently meaningful or accurate according to the indication resulting from application of the consistency policy, as discussed above. As used herein, the term "performance test" can generally refer to any test performed by a cellular field testing tool, consistent with the discussion of FIGS. 1-14, including radiofrequency drive testing and/or any other suitable performance testing regarding how well the device under test operates in connection with one or more cellular or other wireless networks, as discussed above and as further discussed in detail below.

FIG. 15A helps to illustrate the concept of cellular carrier aggregation. In the context of wireless networks, cellular carrier aggregation can be used to increase bandwidth per user. In such methodologies, multiple frequency blocks or component carriers may be compiled or aggregated such that together they provide a larger amount of bandwidth to a particular user. Increasing the number of such frequency blocks can thereby increase the bandwidth delivered to that particular user.

The example of FIG. 15A uses LTE technology, and in other examples the same carrier aggregation methodology may apply to other radio access technologies including new radio or 5G, and this application can cover the general concept of carrier aggregation without being limited necessarily to a specific radio access technology or specific generation of cellular technology. In the context of carrier aggregation, downstream and/or upstream throughput can increase with the number of component carriers. By analogy, increasing the number of lanes, such as lanes 1516-1520, along a highway can increase the overall throughput of the highway. In the example of FIG. 15A, a carrier component 1508, a carrier component 1506, and a carrier component 1504 can be combined, where each are provided by a cellular base station 1502, with each representing 20 MHz of radio frequency spectrum and/or 150 megabits per second, thereby resulting in greater bandwidth at an item of user equipment, such as a smartphone 1522. As further shown in this figure, the display of smartphone 1522 indicates that an overall bandwidth may correspond to 450 megabits per second.

FIG. 15B shows a diagram 1500B, in plan view, for a cellular base station 1538, which is been divided into three separate sectors corresponding to 120 degrees each using dividers 1532-1536. A figurative ring 1530 indicates a range of cellular base station 1538, although this diagram is not necessarily drawn to scale. Cellular base stations may be divided into three different sectors for a variety of different reasons. By splitting the cellular base station's propagation field into separate areas, the corresponding radiation and information can be pointed to particular targets or destinations. This can increase the performance of the cellular base station in certain areas while nevertheless potentially lowering noise. Additionally, by splitting of the cellular base station's propagation field into separate areas, it can become easier to prevent the cellular base station from being overloaded. Furthermore, splitting the cellular base station's propagation field into separate areas can increase capacity for load-balancing. In such scenarios, if a particular subarea becomes overwhelmed with network traffic, then one or more of the remaining subareas can compensate, which can prevent negative user experiences. Splitting the cellular base station's propagation field into separate areas can also help to eliminate or ameliorate noise with signal propagation. For example, in certain scenarios other cellular base stations can cause noise with respect to similar radio frequencies.

Figure 15C:
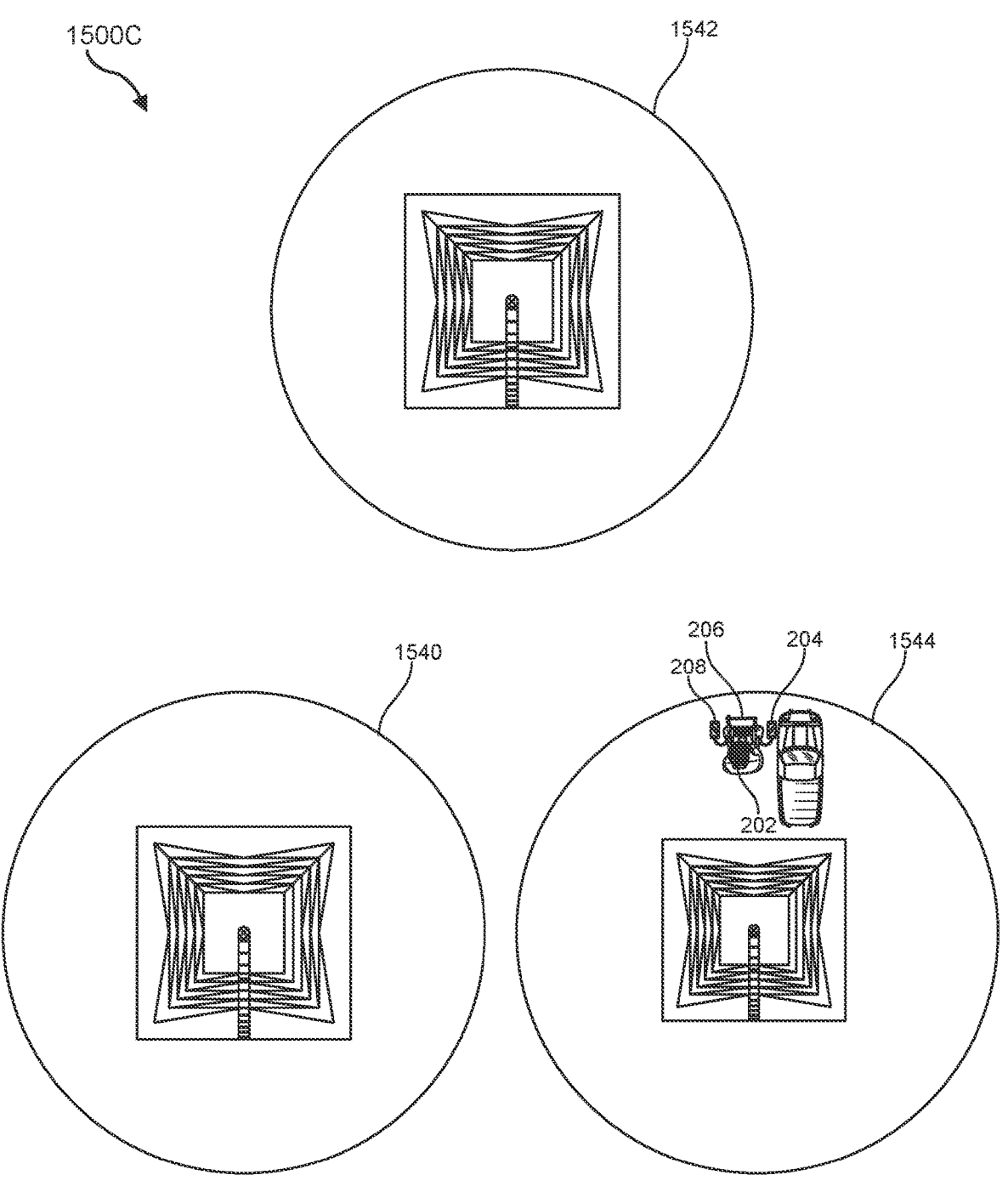
FIG. 15C shows a diagram illustrating how a user may connect with one of three different cellular base stations

FIG. 15C shows another diagram 1500C, which is similar to diagram 1500B, except that diagram 1500C includes three separate cellular base stations 1540-1544. Moreover, this diagram also further illustrates how user 202, smartphone 208, smartphone 204, and laptop 206 can be connected to, or associated with, just one of these cellular base stations, and in particular cellular base station 1544. In other words, even though the remaining cellular base stations 1540-1542 are nearby or adjacent to cellular base station 1544, in this example user 202 and his devices may only be connected to and/or associated with one of these cellular base stations. Furthermore, despite the presence of the remaining adjacent cellular base stations, user 202 and his devices may not only be connected to the same singular cellular base station, but may also be connected to the same single sector within that cellular base station (see FIG. 15B). Within that singular sector, the user devices may each respectively be connected to the cellular base station using carrier aggregation that combines effectively multiple distinct component carriers to provide increased bandwidth to each one of the two separate devices, the device under test and the reference device, as discussed in more detail below in connection with FIG. 16.

Figure 16:
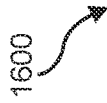
FIG. 16 shows a diagram illustrating how a user operating a cellular field testing tool may operate a device under test and also a reference device using carrier aggregation at both of these devices.

FIG. 16 shows another diagram 1600 of user 202, smartphone 204, smartphone 208, and laptop 206. As further shown within this diagram, the devices of the user may be connected to a cellular base station 1612. Smartphone 204 and smartphone 208 may each have two respective connections to cellular base station 1612. In particular, smartphone 204 may have a connection 1614 and a connection 1616 to cellular base station 1612. Similarly, smartphone 208 may have a connection 1620 and a connection 1618 to cellular base station 1612. Each of within each of these pairs of connections, corresponds to a separate component carrier for performing carrier aggregation, as further discussed above. Nevertheless, the particular carrier aggregation combination for smartphone 204 may be relevantly different than the carrier aggregation combination for smartphone 208. If the difference between these two carrier aggregation combinations is sufficiently large or relevant, as discussed further below, then the two devices may be operating under such different conditions that comparing the performance of the device under test with the performance of the reference device may lose some or all meaningfulness or reliability in terms of test results. Accordingly, it can be desirable or preferable to apply one or more consistency policies to ensure that, even if the carrier aggregation configuration for the device under test and the carrier aggregation configuration for the reference device are not identical, these two configurations nevertheless have a sufficient level of similarity, or otherwise satisfy one or more rules, that ensure that the performance of the two devices remain meaningfully or relevantly comparable. To be more specific or precise, this application further discloses specific rules or consistency policies that establish thresholds or conditions to appropriately distinguish between sufficiently similar pairs of carrier aggregation configurations and those that are not, as discussed in more detail below.

Figure 17:
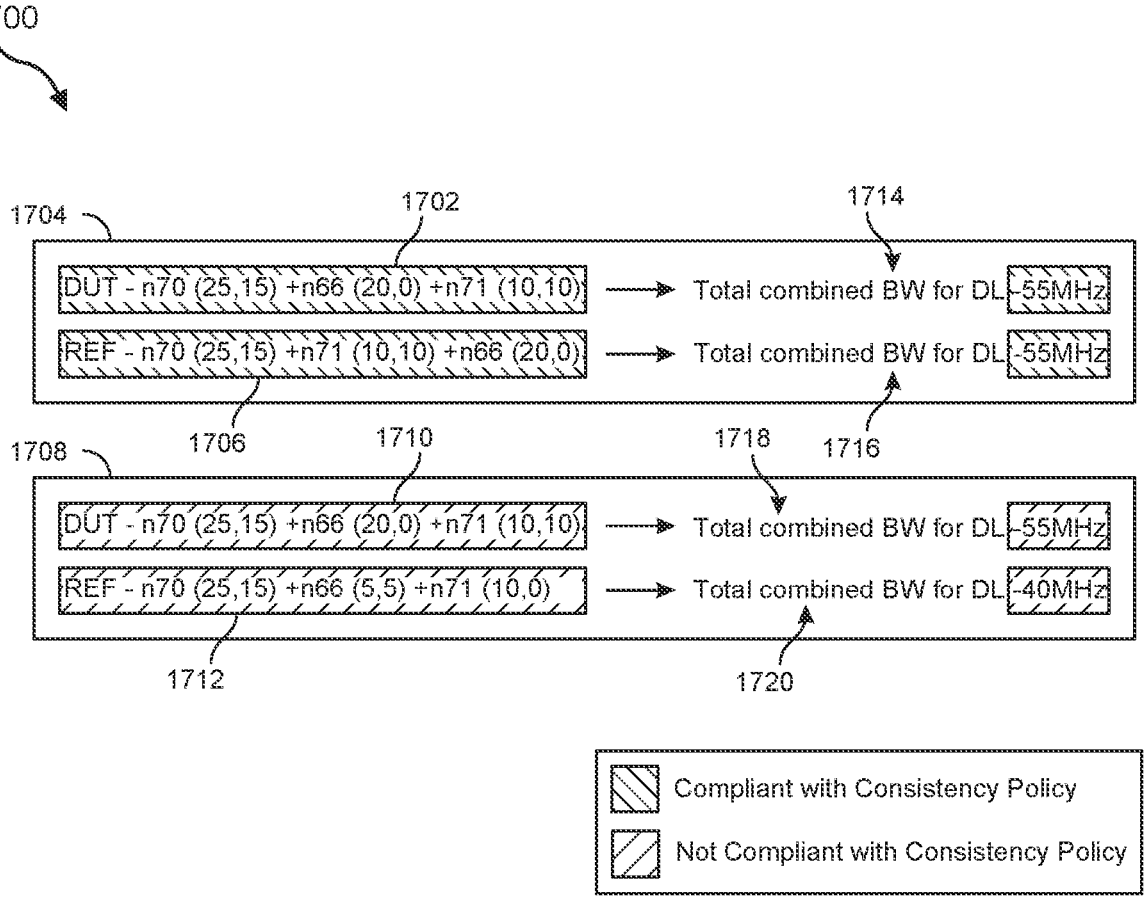
FIG. 17 shows a figurative diagram illustrating how a consistency policy may be applied to two different data structures describing examples of carrier aggregation to verify whether the instances are sufficiently similar according to the consistency policy for purposes of performance testing by the cellular field testing tool.

FIG. 17 shows a diagram 1700 that includes a graphical representation of a cellular carrier aggregation pair 1704 and a cellular carrier aggregation pair 1708, both of which may describe the carrier aggregation at a device under test and a corresponding reference device at the same time. In particular, cellular carrier aggregation pair 1704 includes or indicates a carrier aggregation 1702 for the device under test and a carrier aggregation 1706 for the reference device. Similarly, cellular carrier aggregation pair 1708 includes or indicates a carrier aggregation 1710 for the device under test and a carrier aggregation 1712 for the reference device. Furthermore, as shown in this figure, indicators 1714-1720 further highlight how the respective carrier aggregations indicate respective download speeds that, when combined, result in a calculated total number for each carrier aggregation.

For each carrier aggregation, there are in this example three separate bands or component carriers that, when aggregated, provide the total combined bandwidth, as shown. For example, carrier aggregation 1702 specifies the following three separate bands or component carriers: n70 (25 MHz download and 15 MHz upload), n66 (20 MHz download and 0 MHz upload), and n66 (10 MHz download and 10 MHz upload), in that order. Indicator 1714 further highlights that the total combined bandwidth for download speeds may correspond to 55 MHZ, based on three download speeds listed above and shown within carrier aggregation 1702 within diagram 1700.

Cellular carrier aggregation pair 1704 indicates that its two respective cellular carrier aggregations satisfy the consistency policy. In contrast, cellular carrier aggregation pair 1708 indicates that its two respective cellular carrier aggregations do not satisfy the same corresponding consistency policy. Accordingly, cellular carrier aggregation pair 704 and cellular carrier aggregation pair 708, when viewed together, help to highlight an inventive concept and/or consistency policy concept that can be useful when distinguishing between pairs of carrier combinations that are sufficiently similar to ensure reliable or meaningful output, as further discussed above, and those pairs that are not.

In the example of FIG. 17, the two carrier combinations in each carrier aggregation pair are not identical. (In a stricter embodiment that applies a stricter consistency policy, the consistency policy may require the two carrier aggregations to be identical.) Nevertheless, in the approved cellular carrier aggregation pair 704, the total bandwidth for download, as indicated by indicator 1714 and indicator 1716, is the same at 55 MHz. In other words, the consistency policy ensures that a first total bandwidth for both primary cells and secondary cells of the device under test and a second total bandwidth for primary cells and secondary cells of the reference device are the same. Accordingly, the consistency policy of this example may require the total combined bandwidth for download to be identical. In contrast, cellular carrier aggregation pair 1708 shows that carrier aggregation 1710 and carrier aggregations 1712 result in different total combined bandwidths for download, as indicated by indicator 1718 and indicator 1720.

In the example of FIG. 17, cellular carrier aggregation pair 1704 also illustrates how the consistency policy can ensure that primary cells for the device under test and primary cells for the reference device operate on the same frequency band (i.e., n70). Additionally, or alternatively, the consistency policy can ensure the consistency policy ensures that primary cells for the device under test and primary cells for the reference device have the same bandwidth (i.e., 25 MHZ download and/or 15 MHz upload).

In this particular example, carrier aggregation 1702 and carrier aggregation 706 both indicate that primary cells are on the n70 band, as shown. More generally, diagram 1700 shows, from left to right, the different bands or component carriers starting with the primary cells, the first secondary cells, and then the second secondary cells, and so forth, with only three bands in each respective carrier aggregation. In the example of carrier aggregation 1702, the secondary cells are located in the order n66 first and n71 second, whereas in carrier aggregation 1706, the secondary cells are arranged or disposed in the opposite order. Nevertheless, cellular carrier aggregation pair 704 indicates that this pair has satisfied the corresponding consistency policy, thereby helping to illustrate how the consistency policy can nevertheless be satisfied even if the two sets of secondary cells are disposed or arranged in different orders, as shown. In other words, the consistency policy permits secondary cells of the device under test and secondary cells of the reference device to indicate a different ordering while still complying with the consistency policy.

In the example of diagram 1700, the cellular field testing tool is configured such that the consistency policy can be applied to a scenario where the device under test and the reference device operate using at least three component carriers. In particular, there are three separate component carriers within each one of carrier aggregation 1702, carrier aggregation 1706, carrier aggregation 1710, and carrier aggregation 1712. Nevertheless, in other examples, different numbers of carrier aggregations may be used. The consistency policy may optionally check whether the number of carrier aggregations is the same between the device under test and the reference device. In additional or alternative examples the number of component carriers within each carrier aggregation may be two or greater than three, for example.

In some examples, the consistency policy ensures that the cellular field testing tool avoids using network output at the device under test from a first radio access technology while using network output at the reference device from a second and distinct radio access technology. For example, the consistency policy prevents a scenario where the device under test uses 5G or new radio while the reference device uses 4G or LTE, or vice versa. In other words, the consistency policy can ensure that the device under test and the reference device are using the same type of radio access technology with respect to the performance test.

Figure 18:
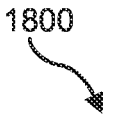
FIG. 18 shows a flow diagram relating to an example method for applying the consistency policy.

FIG. 18 shows a flow diagram for an example method 1800 describing how to apply the consistency policy consistent with FIG. 17, as further discussed above. At step 1802, method 1800 may begin. At step 1804, a decision may be made regarding whether primary cells of the device under test and primary cells of the reference device have the same band, such as n70. At step 1806, a decision may be made regarding whether the primary cells of the device under test and the primary cells of the reference device have the same bandwidth, such as 25 MHz for download. At step 1808, a decision may be made regarding whether the primary cells and all of the secondary cells for the device under test and the primary cells and all of the secondary cells for the reference device indicate the same total bandwidth, such as total downward bandwidth. If the decision is yes at each of steps 1804-1808, then at step 1812, method 1800 may indicate that the consistency policy has been passed. In contrast, if the decision is no at any of these decision steps, then method 1800 may proceed to step 1810, at which point method 1800 may indicate that the consistency policy has been failed. At step 1814, method 1800 may conclude.

Although decision steps 1804-1808 indicate a particular order, any suitable order may be utilized, as understood by those having skill in the art. Moreover, in some examples, one of step 1804 and step 1806 may be made optional or omitted, especially to the extent that a particular band indicates a particular bandwidth.

The performance of method 100 and/or method 1800 may correspond to an additional one of the example preconditions discussed above in connection with FIGS. 2-14. Accordingly, in some examples, the performance of method 100 and/or method 1800 may check whether the corresponding consistency policy has been passed as a precondition for performing a performance test by the cellular field testing tool and/or for certifying the results of such a performance test as meaningful or reliable, as further discussed above. The example of method 1800 is merely illustrative and, in other examples, the vendor, user, administrator, and/or customer may balance competing trade-offs to draw different distinguishing lines between sufficiently similar and insufficiently similar carrier aggregations between the device under test and the reference device, as further discussed above. Nevertheless, the illustrative example of method 1800 can be useful in preventing the performance test from resulting in output that is not necessarily reliable or meaningful due to the fact that the performance test would have been performed under such dissimilar carrier aggregations that deviations may be due to these differences in the carrier aggregations rather than due to any deficiency or shortcoming on the part of the device under test.

Figure 19:
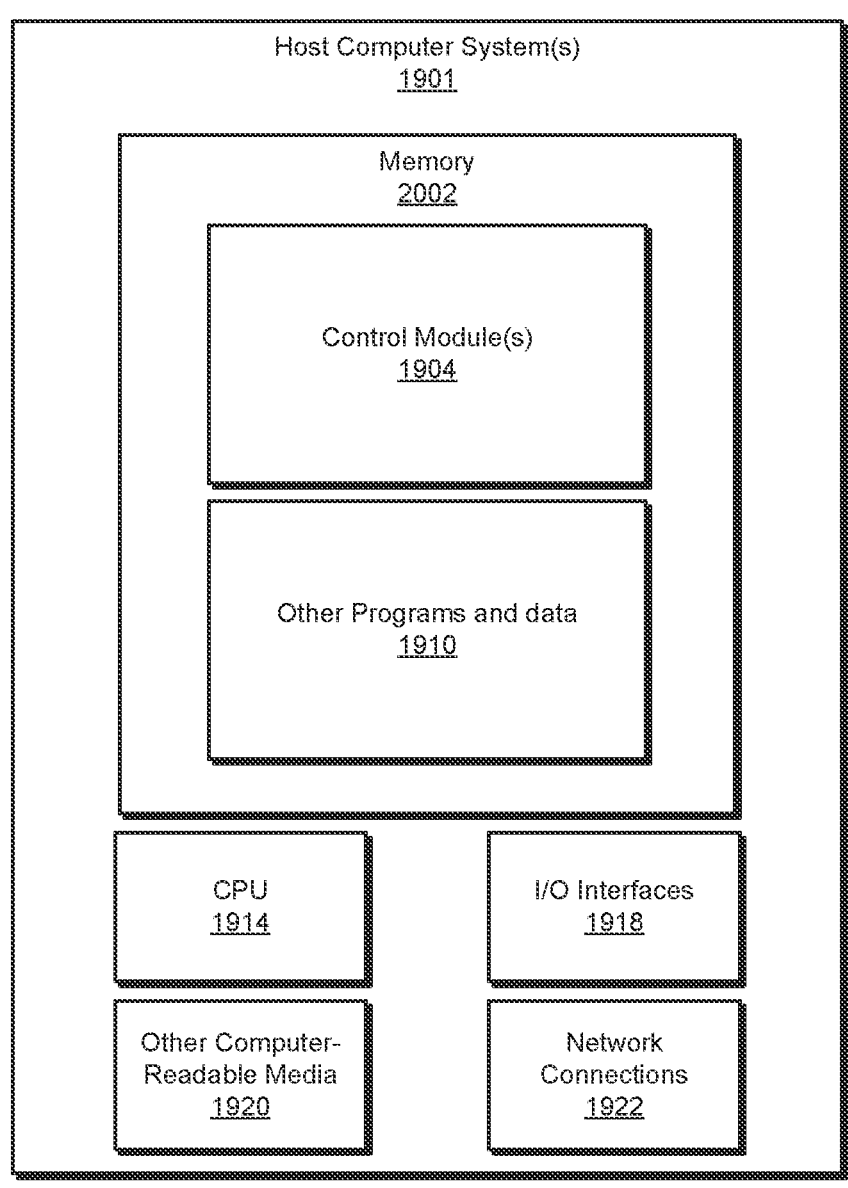
FIG. 19 shows a diagram of an example computing system that may facilitate the performance of one or more of the methods described herein.

FIG. 19 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 19 illustrates an example of underlying hardware on which such software and functionality may be hosted and/or implemented.

In particular, shown is example host computer system(s) 1901. For example, such computer system(s) 1901 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1901 may include memory 1902, one or more central processing units (CPUs) 1914, I/O interfaces 1918, other computer-readable media 1920, and network connections 1922.

Memory 1902 may include one or more various types of non-volatile and/or volatile storage technologies. Examples of memory 1902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1902 may be utilized to store information, including computer-readable instructions that are utilized by CPU 1914 to perform actions, including those of embodiments described herein.

Memory 1902 may have stored thereon control module(s) 1904. The control module(s) 1904 may be configured to implement and/or perform some or all of the functions of the systems or components described herein. Memory 1902 may also store other programs and data 1910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1922 are configured to communicate with other computing devices to facilitate the functionality described herein. In various embodiments, the network connections 1922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1918 may include a video interface, other data input or output interfaces, or the like. Other computer-readable media 1920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

initiating a cellular field testing tool that tests a condition of cellular network connectivity of a device under test;

detecting, by the cellular field testing tool, a first data structure specifying a first cellular carrier aggregation configuration at the device under test;

detecting, by the cellular field testing tool, a second data structure specifying a second cellular carrier aggregation configuration at a reference device; and outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

2. The method of claim 1, wherein the consistency policy ensures that the first cellular carrier aggregation configuration and the second cellular carrier aggregation configuration are the same.

3. The method of claim 1, wherein the consistency policy ensures that the cellular field testing tool avoids using network output at the device under test from a first radio access technology while using network output at the reference device from a second and distinct radio access technology.

4. The method of claim 1, wherein the consistency policy ensures that primary cells for the device under test and primary cells for the reference device operate on the same frequency band.

5. The method of claim 1, wherein the consistency policy ensures that primary cells for the device under test and primary cells for the reference device have the same bandwidth.

6. The method of claim 1, wherein the consistency policy ensures that a first total download bandwidth for both primary cells and secondary cells of the device under test and a second total download bandwidth for primary cells and secondary cells of the reference device are the same.

7. The method of claim 6, wherein the consistency policy ignores upload bandwidth.

8. The method of claim 1, wherein the consistency policy permits secondary cells of the device under test and secondary cells of the reference device to indicate a different ordering while still complying with the consistency policy.

9. The method of claim 1, wherein the consistency policy ensures that the device under test and the reference device use a same number of component carriers during the performance test.

10. The method of claim 1, wherein the cellular field testing tool is configured such that the consistency policy can be applied to a scenario where the device under test and the reference device operate using at least three component carriers.

11. A system comprising:

a physical computing processor; and a non-transitory computer-readable medium encoding instructions that, when executed by the physical computing processor, cause the physical computing processor to perform operations comprising:

initiating a cellular field testing tool that tests a condition of cellular network connectivity of a device under test;

detecting, by the cellular field testing tool, a first data structure specifying a first cellular carrier aggregation configuration at the device under test;

detecting, by the cellular field testing tool, a second data structure specifying a second cellular carrier aggregation configuration at a reference device; and outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

12. The system of claim 11, wherein the consistency policy ensures that the first cellular carrier aggregation configuration and the second cellular carrier aggregation configuration are the same.

13. The system of claim 11, wherein the consistency policy ensures that the cellular field testing tool avoids using network output at the device under test from a first radio access technology while using network output at the reference device from a second and distinct radio access technology.

14. The system of claim 11, wherein the consistency policy ensures that primary cells for the device under test and primary cells for the reference device operate on the same frequency band.

15. The system of claim 11, wherein the consistency policy ensures that primary cells for the device under test and primary cells for the reference device have the same bandwidth.

16. The system of claim 11, wherein the consistency policy ensures that a first total bandwidth for both primary cells and secondary cells of the device under test and a second total bandwidth for primary cells and secondary cells of the reference device are the same.

17. The system of claim 16, wherein the consistency policy ignores upload bandwidth.

18. The system of claim 11, wherein the consistency policy permits secondary cells of the device under test and secondary cells of the reference device to indicate a different ordering while still complying with the consistency policy.

19. The system of claim 11, wherein the consistency policy ensures that the device under test and the reference device use a same number of component carriers during the performance test.

20. A non-transitory computer-readable medium encoding instructions that, when executed by at least one physical processor of a computing device, cause the computing device to perform operations comprising:

initiating a cellular field testing tool that tests a condition of cellular network connectivity of a device under test;

detecting, by the cellular field testing tool, a first data structure specifying a first cellular carrier aggregation configuration at the device under test;

detecting, by the cellular field testing tool, a second data structure specifying a second cellular carrier aggregation configuration at a reference device; and outputting, by the cellular field testing tool, an indication of whether the first cellular carrier aggregation configuration and the second cellular carrier aggregation configuration satisfy a consistency policy applied by the cellular field testing tool to ensure that a performance test is performed under conditions in which the first cellular carrier aggregation configuration and the second cellular carrier aggregation configuration are sufficiently similar to ensure reliable output of the performance test according to the consistency policy.

* * * * *